(12) United States Patent
Oros

(10) Patent No.: US 7,822,671 B1
(45) Date of Patent: Oct. 26, 2010

(54) METHOD AND SYSTEM FOR INTEGRATING INVESTMENT ADVICE WITH FINANCIAL ACCOUNT STATEMENT INFORMATION

(75) Inventor: Robert Oros, Richfield, OH (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 12/056,998

(22) Filed: Mar. 27, 2008

Related U.S. Application Data

(63) Continuation of application No. 10/210,410, filed on Jul. 31, 2002, now Pat. No. 7,383,218.

(51) Int. Cl.
*G06Q 40/00* (2006.01)

(52) U.S. Cl. .................................... 705/36 R
(58) Field of Classification Search ............... 705/36 R
See application file for complete search history.

(56) References Cited

U.S. PATENT DOCUMENTS

| | | | | |
|---|---|---|---|---|
| 5,884,287 | A * | 3/1999 | Edesess | 705/36 R |
| 5,920,848 | A * | 7/1999 | Schutzer et al. | 705/42 |
| 6,085,174 | A * | 7/2000 | Edelman | 705/36 R |
| 6,154,732 | A * | 11/2000 | Tarbox | 705/36 R |
| 6,202,054 | B1 * | 3/2001 | Lawlor et al. | 705/42 |
| 6,219,650 | B1 * | 4/2001 | Friend et al. | 705/36 R |
| 6,223,983 | B1 * | 5/2001 | Kjonaas et al. | 235/379 |
| 6,304,897 | B1 * | 10/2001 | Venkatraman et al. | 709/206 |
| 6,430,542 | B1 * | 8/2002 | Moran | 705/36 R |
| 7,155,407 | B2 * | 12/2006 | Bowser | 705/35 |
| 2002/0035527 | A1 * | 3/2002 | Corrin | 705/35 |
| 2002/0091608 | A1 * | 7/2002 | Odegaard et al. | 705/36 |

* cited by examiner

*Primary Examiner*—James Kramer
*Assistant Examiner*—Lindsay M. Maguire
(74) *Attorney, Agent, or Firm*—Townsend and Townsend and Crew, LLP

(57) ABSTRACT

A method and system which provides for generating an integrated report. The method and system utilize information in a data storage system to provide individual account holders with an integrated report which includes detailed information regarding the financial account, and integrates financial planning recommendation information with the information regarding the financial account. Typically, the information regarding the financial account will be of sufficient detail so that a separate account statement need not be sent to the individual. The system and method herein provide individual account holders with a single report which provides the individual with financial account information, and financial planning advice, utilizing data available in a data storage system. Thus, the individual need not seek out advice, rather it is proactively delivered to the individual. Further, the method and system can provide for periodically generating the integrated report without requiring periodic input or action on the part of the account holder.

27 Claims, 18 Drawing Sheets

OVERVIEW INVESTMENTS ACTIVITY CONTRIBUTIONS PERFORMANCE ADVICE

Activity By Investment

| | Value as of 02/1/01 | Contributions | Transfers In/Out | Gain/Loss¤ | Value as of 4/30/01 |
|---|---|---|---|---|---|
| Brandywine | $49,909.99 | $380.17 | $81.03 | $1,282.79 | $49,088.40 |
| Schwab S&P 500 Inv | 9,996.58 | 76.04 | 16.20 | -834.13 | 9,254.69 |
| Schwab 1000 Inv | 10,057.68 | 76.04 | 16.20 | -858.59 | 9,291.33 |
| Dreyfus Founders Discovery F | 55,596.47 | 456.20 | 97.23 | -7,051.68 | 49,098.22 |
| Strong Government Securities Inv | 0.14 | 0.00 | 0.00 | 0.00 | 0.14 |
| Dreyfus Founders Balanced F | 3,150.91 | 456.20 | 97.23 | -115.17 | 3,589.17 |
| Schwab Stable Value | $11,151.07 | 76.04 | 16.20 | 147.46 | 11,390.77 |
| Totals | $193,304.19 | $1,520.69 | $0.00 | $-24,636.08 | $170,189.80 |

¤You repaid principal of $324.09. Interest of $103.59 was applied according to your investment instructions on the date applied. This interest amount is

Activity By Contribution Source

| | Associate 401(k) | Company Matching | Company Profit Sharing | Qualified Non-Elective | Totals |
|---|---|---|---|---|---|
| Value as of 2/1/01 | $64,248.76 | $11,225.71 | $117,505.91 | $323.81 | $193,304.19 |
| Contributions | 1,351.72 | 168.97 | 0.00 | 0.00 | 1,520.69 |
| Gain/Loss | | | | | -152.32 |
| Fees | -61.11 | -7.97 | -83.01 | -0.23 | |
| Investment Earnings | -7,450.92 | -1,503.22 | -15,588.03 | -44.18 | -24,586.35 |
| Loan Interest Payments | 103.59 | 0.00 | 0.00 | 0.00 | 103.59 |
| Value as of 4/30/01 | $58,192.04 | $9,883.49 | $101,834.87 | $279.40 | $170,189.80 |
| Vested Percent | 100% | 100% | 100% | 100% | |
| Amount Vested | $58,192.04 | $9,883.49 | $101,834.97 | $279.40 | $170,189.80 |

OVERVIEW  INVESTMENTS  ACTIVITY  CONTRIBUTIONS  PERFORMANCE  CLEARFUTURE

MODERATELY AGGRESSIVE

This strategy is for long-term investors who are looking for good growth and do not need current income. A fair amount of risk is acceptable but not as much as if they invested exclusively in stocks. Is this strategy right for you? Try our Investor Profile tool!

>> Investor Profiler Tool

MORNINGSTAR SUGGESTS

Morningstar ClearFuture suggests that you decrease your allocation to stocks, in order to spread your risk more evenly across the major asset classes. Your overall recommended asset mix is Balanced, ideal for investors who seek growth, but can also stand some variations in market value.

>> Learn More

ASSET ALLOCATION

This chart shows how your account is divided between the different types of investments within your plan. Asset allocation has been proven to be one of the most important factors in determining your portfolio's performance. For more information, see "Learn about asset allocation" on schwabplan.com.

PERSONAL RETURN

| | |
|---|---|
| This Period | -7.41% |
| Year to Date | -7.41% |

Your Personal Rate of Return calculation reflects all activity in your account including any expenses you may have paid. Your Personal Rate of Return is impacted by several factors including your personal asset allocation, the timing and amount of any transactions in the account and, of course, the performance of the funds that you invested in during the period.

Asset Allocation as of October 31, 2001

| | Number of Shares | Share Price | Ending Value |
|---|---|---|---|
| 53% Stocks | | | |
| Large Company 23% | | | |
| 8% Janus | 174.565 | $22.11 | $3,859.63 |
| 15% Schwab 1000 Inv | 244.746 | $29.57 | $7,237.14 |
| Small Company 22% | | | |
| 13% PBHG Growth | 338.288 | $18.56 | $6,278.63 |
| 9% Baron Asset | 4,357.140 | $1.00 | $4,357.14 |
| International 8% | | | |
| 8% Templeton Foreign A | 457.203 | $8.66 | $3,959.38 |
| 9% Bonds | | | |
| 9% Dreyfus Short-Intermediate Govt | 399.738 | $11.03 | $4,409.11 |
| 29% PCRA | | | |

Total Account Value as of October 31, 2001    $49,601.03

CONTACT US     PRINT THIS PAGE

METHOD AND SYSTEM FOR INTEGRATING INVESTMENT ADVICE WITH FINANCIAL ACCOUNT STATEMENT INFORMATION

CROSS REFERENCES TO RELATED APPLICATIONS

This application is a continuation of U.S. patent application Ser. No. 10/210,410, filed Jul. 31, 2002 now U.S. Pat. No. 7,383,218, entitled "Method and System for Integrated Investment Advice With Financial Account Statement Information," the disclosure of which is herein incorporated by reference in its entirety for all purposes.

TECHNICAL FIELD

The present invention relates to a system and method for producing an integrated report that incorporates financial account statement information and financial planning advice for retirement plan participants.

BACKGROUND OF THE INVENTION

Employee benefit plans are widely used today by both employees and employers to provide for an individual employee's retirement needs. Pursuant to these employee benefit plans, employees can establish financial accounts under the benefit plan. These financial accounts and the employee benefit plans are established and structured to comply with various tax and employment laws.

These benefit plans are administered by a plan administrator who works with the employer (the plan sponsor) to help establish and maintain the benefit plan. The plan administrator is a financial institution or a third party administrator that operates to administer the employee benefit plan. Among other responsibilities, the plan administrator will maintain detailed records showing all transactions in the individual accounts, and will, pursuant to the individual account holder instructions, cause transactions to be executed in the individual's financial account. In some cases the plan administrator may be part of a larger financial institution that includes a broker dealer, and in other cases the plan administrator will be a separate entity which will work with a broker dealer. A typical scenario would include a broker dealer establishing a trust account which holds all of the assets for a retirement plan, but the broker dealer typically does not maintain records for each of the individual accounts. The plan administrator would maintain records as for each of the individual accounts and would convey instructions to the broker dealer for specific transactions which are to be executed in the trust account. The plan administrator would maintain records of all the transactions for each of the individual accounts. Collectively, the combination of all the individual accounts would correspond to the holdings in the trust account held by the broker dealer.

Typically, benefit plans will be established to provide individual employees with a range of different investment options representing a broad spectrum of different possible asset classes. Frequently, these investment options include a variety of different mutual funds, and other fixed income investments, and money market funds. Company stock may also be an option for some plans.

Individual employees participating in these retirement plans can elect to have a certain percentage of their paycheck or a flat dollar amount deposited into their financial account established under the benefit plan. Frequently, the employer will also make contributions to the employee's financial account under the benefit plan. In connection with opening an account under the benefit plan the plan administrator will receive detailed personal information for the individual employee. This information can include the individual's age, date of hire, number of dependents, annual salary, job title/profession, home mailing address, social security number, e-mail address, and possibly a personal identification number (PIN). The plan administrator maintains a data storage system tracking all of the investments for each of the financial accounts under the benefit plan. The plan administrator also causes different transactions to be executed, such as the buying and selling of securities, pursuant to instructions from the individual employees.

In many instances the individuals will make their own decisions regarding the buying and selling of different securities. The plan administrator operates a computer system which can track all of the transactions and deposits, withdrawals and earnings for the individual financial accounts. Further, the individuals can generally choose to either increase or decrease the amount of their paycheck which they direct to their financial account.

On a periodic basis, which is generally quarterly, the plan administrator will issue an account statement to the individual employees who have individual financial accounts established pursuant to a benefit plan. These account statements typically include information about the financial account such as the value of the account at the beginning of the present calendar year, the value of the account at the time statement was prepared, the assets held in the account, and a description of all transactions in the account during the account period.

FIG. 1 shows an overview of the architecture of a system 100 for implementing account statements for a benefit plan under the prior art. This system includes a data storage system 110 for storing financial account information. The data storage system also includes information identifying the individual owner, or individual associated, with a financial account, and includes personal information for the individual. On a periodic basis typically quarterly a processor system 112 extracts data from the data storage system 110 and then uses this data to prepare an account statement. In some cases the processor system may include multiple processor systems and the plan administrator may outsource the preparation and delivery of the account statements. In such situation, the plan sponsor would provide account information to a third party and the third party would use a processor system to format and prepare the information so that the account statement could be prepared and delivered to the individual associated with the account. This account statement could be delivered to the individual by printing the account statement and sending it via mail 114, or the account statement could be formatted for transmission via e-mail 116, or the account statement could be formatted so that it could be made accessible to the individual over the web 118 using a personal computer with an internet browser. Numerous methods have been developed for using computer systems such as the Internet to securely deliver confidential information. For example, the following US patents and International patent applications, which are incorporated herein in their entirety by reference, provide discussion of details of delivering confidential information using the internet: U.S. Pat. Nos. 6,367,010 B1 (METHOD FOR GENERATING SECURE SYMMETRIC ENCRYPTION AND DECRYPTION); 6,014,688 (E-MAIL PROGRAM CAPABLE OF TRANSMITTING, OPENING AND PRESENTING A CONTAINER HAVING DIGITAL CONTENT USING EMBEDDED EXECUTABLE SOFTWARE); 6,304,897 B1 (METHOD OF PROCESSING AN E-MAIL MESSAGE THAT INCLUDES A REPRESENTA- TION OF AN ENVELOPE); and international patent applications: WO 98/49643; WO 01/03367; WO 99/34286; WO 00/46729; WO 01/78491.

The value of the account statement to the individual is that it gives the individual some idea of the past performance of the account, and lets the individual review recent transactions in the account. In the past these account statements have not provided individualized financial planning advice regarding steps that an individual could take to improve the performance of the account relative the individuals retirement needs.

In the past when an individual wanted to receive specific advice regarding financial planning for a retirement account, the individual could go to a number of different sources. Traditionally, an individual would enlist the services of a financial adviser. The financial advisor would review the individual's retirement needs and make recommendations for changes to be made in connection with a financial account.

In recent years a number of software tools have been made available to individuals, so that they can determine there own financial plan without going directly to a financial advisor. Two example's of software tools which are available include a retirement planning tool provided by mPower Advisors LLC, San Francisco, Calif. (website www.mpower.com) and a retirement planning tool provided by Financial Engines, Palo Alto, Calif. (website www.financialengines.com). Financial Engines is shown as an assignee on a number of patents related to retirement planning tools including U.S. Pat. Nos. 6,292,787 ("Enhancing utility and diversifying model risk in a portfolio optimization framework"); 6,125,355 ("Pricing module for financial advisory system"); 6,021,397 ("Financial advisory system"); 6,012,044 ("User interface for a financial advisory system"); 5,918,217 ("User interface for a financial advisory system"), which are incorporated herein by reference.

Another system has been proposed where an individual can receive financial investment advice such that, they are directed to investments in specific trusts, or investment vehicles, which are managed pursuant to certain asset allocation models, as discussed in U.S. Pat. No. 6,154,732 "System for providing investment advice and management of pension assets" which is incorporated herein by reference.

In general operation the prior retirement planning tools appear to require that an individual seek out advice. This means, for example, that an individual most go to either Mpower or Financial Engines website, or other website that provides access to a financial planning tool, and input information into the financial planning tool. This information could include an individuals age, current income, financial assets held in a retirement account, age at which an individual would like to retire etc. Based on this information, the financial planning tool can then provide an estimate showing the likely amount of money that one would have upon retirement. Further, the financial planning tool can also make recommendations as to changes in investments, and future financial planning steps to improve the performance of the financial account to improve the probability that an individual will have sufficient assets at the time of retirement.

One disadvantage with the present system is that the individual must take affirmative steps to get financial planning advice. Specifically, an individual must make time available to seek out financial planning advice. This means an individual must locate financial planning tools or resources and then use the financial planning tool or resource to get financial planning advice. Frequently, individuals do not make the time to seek out financial planning advice.

One disadvantage with the present account statements is that they typically report historical information, and they do not provide advice as to future financial planning strategy. Basically, these account statements provide a snapshot of where the account stands at the time of the account statement, and some information regarding the past condition of the account.

SUMMARY OF THE INVENTION

A system according to an embodiment of the invention herein provides financial planning advice to individuals. The system includes a data storage system which stores financial account information for a plurality of financial accounts, and stores information identifying an individual associated with each of the plurality of financial accounts, and stores personal information for each of the individual account holders. The system also includes a processor system adapted for analyzing financial account information for a financial account, and adapted for analyzing personal information for an individual associated with the financial account to determine a financial planning recommendation for the individual. Further, the processor system is adapted to analyze the financial account information to determine a group of financial account statement information for the financial account, and to incorporate the financial planning recommendation and the group of financial account statement information into an integrated report, and wherein the processor system is further adapted to periodically generate integrated reports for the individual using information from the data storage system without requiring without further input from the individual in connection with periodically generating the integrated reports.

A method according to an embodiment of the invention herein provides for periodically generating an integrated report which includes both a financial planning recommendation and a group of financial account statement information. The method includes storing financial account information and personal information in a data storage system, and periodically identifying a group of financial account information for a financial account belonging to an individual, from information stored in a data storage system, where the data storage system stores financial account information and personal information. The further includes periodically determining a financial planning recommendation for the individual, wherein the financial planning recommendation is predicted to improve the performance of the financial account, and periodically combining the group of financial account statement information and the financial planning recommendation to generate the integrated report and transmitting the integrated report to the individual, without requiring periodic input from the individual.

BRIEF DESCRIPTION OF THE DRAWINGS

FIGS. 5(a)-5(h) show an integrated report of the present invention.

FIGS. 6(a)-6(f) show additional embodiments of aspects of an integrated report of the present invention.

DETAILED DESCRIPTION

Figure 1:
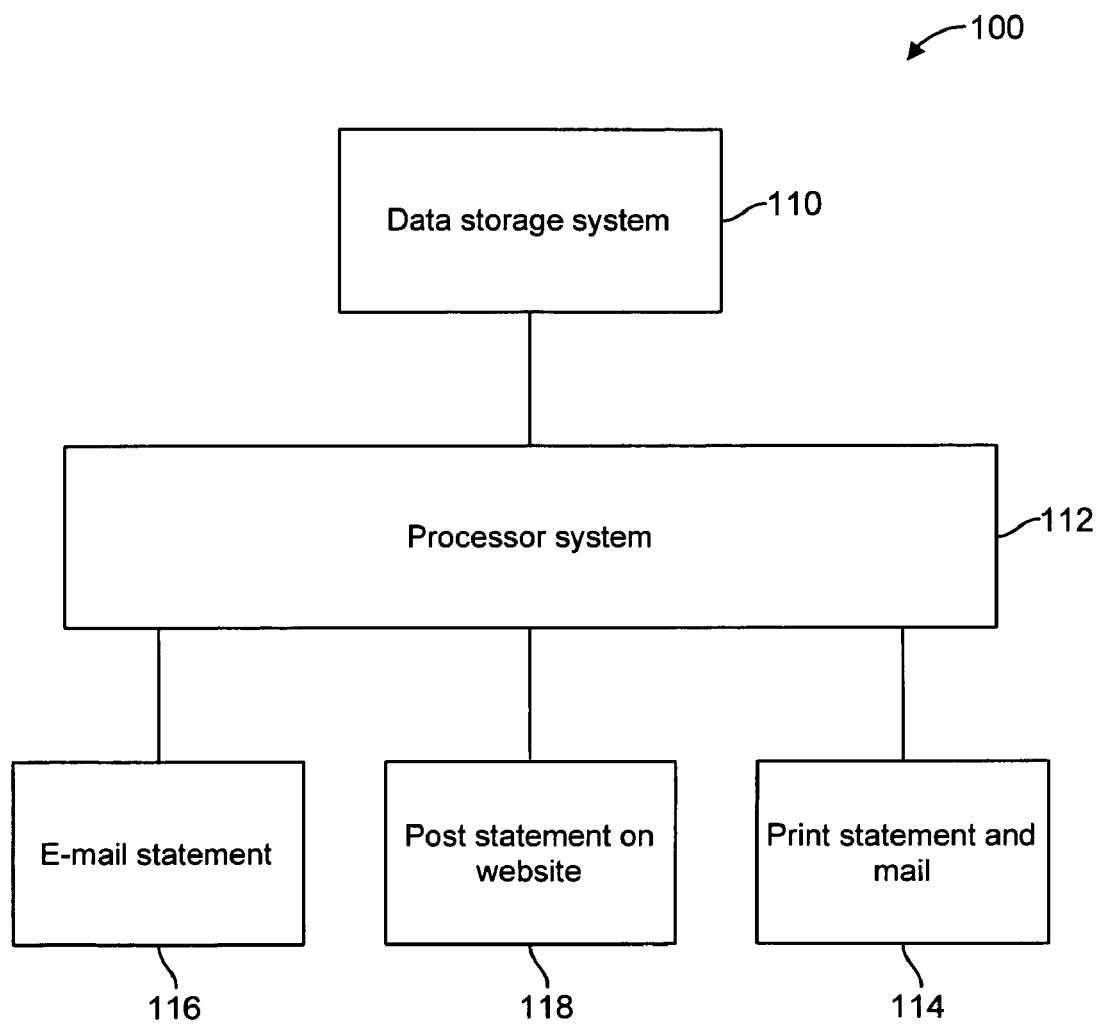
FIG. 1 is a diagram of a system for generating account statements of the prior art.

As discussed above employers can work with plan administrators to establish benefit plans. Pursuant to a benefit plan individual retirement accounts are established, and the plan administrator keeps data for each of the accounts. From the perspective of an overall computer architecture for administering a benefit plan, the system includes a data storage system which holds information showing all of the assets held in each of the financial accounts. The data storage system also includes information identifying each of the individuals associated with each financial account. The data storage system will also store personal information for each of the individuals.

Personal information can include information such as birth date, annual income, residence address, employer, marital status, number of dependents etc. In addition the personal information utilized by the present information could also include information from an individual indicating the age at which the individual would like to retire and the percentage of current income that the individual expects to need upon retirement. The financial account information will typically include information showing historical activity in a financial account, such as a record of all purchases and sales of assets in the account, all deposits and withdrawals from an account. In the case of individual retirement accounts under the plan the financial account information will also include a data showing how much is to be deposited into the account on a periodic basis (e.g. a percentage of each paycheck) and any information regarding loans which may have been taken from an individual account.

One type of retirement account which is widely used is an account established under a benefit plan set up in accordance with §401(k) of the Internal Revenue code. Other similar plans include Individual Retirement Accounts (IRAs) and Keogh Plans. It is frequently the case that the individual participants in these plans are responsible for directing their own investment decisions with respect to these accounts.

The invention herein delivers a financial planning recommendation to the individual account holders in connection with periodic transmission of account statement information. The financial planning recommendation includes investment strategy (asset allocation) advice, and by including this financial planning recommendation, with the account statement information it is believed that the probability that an individual will receive, and act upon, expert financial planning, and thereby improve their account's financial performance relative to the individual's retirement needs will be enhanced. Further, an embodiment of the system and method herein deliver periodically updated financial planning recommendations and combine this recommendation with account statement information to provide an integrated report. Thus, the integrated report should have a greater value for an individual account holder than traditional account statements, because the report contains not only information about the present condition of the account, it also includes a financial planning recommendation including recommended actions, such as purchasing or selling specific investments which should improve the financial performance of the account.

Figure 2:
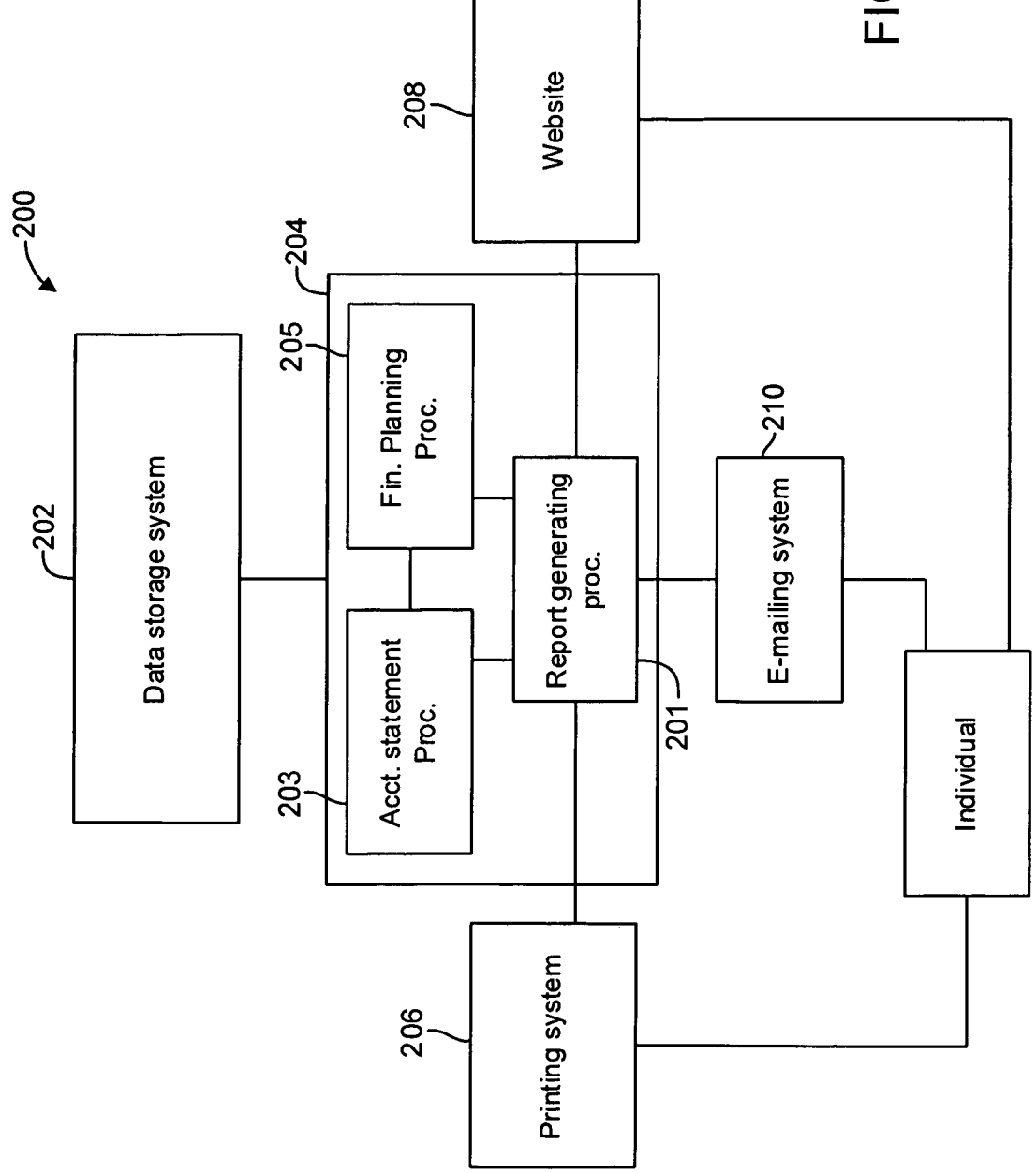
FIG. 2 is a diagram of a system for generating integrated reports of the present invention.

FIG. 2 shows a view of the system 200 of the invention. The system includes a data storage system 202, which holds both the personal information and financial account information as described above. A processing system 204 operates to access and analyze the information in the data storage system 202. This processing system may in many cases include multiple processor systems networked together which access, analyze and manage data stored in the data storage system. On a periodic basis the processor system 204 will access data and analyze the data in connection with identifying and preparing account statement information.

In one embodiment account statement information for an individual account is prepared on a quarterly basis, and is combined with a financial planning recommendation to generate an integrated report on a quarterly basis. This account statement information can include a summary of the total holdings in the account, and also provide a detailed report showing the specific holdings of different assets in the retirement account. For example, the information can show the values for different equity shares held, cash positions, specific mutual funds, money market funds, and holdings in fixed income products such as bonds. In addition the account statement information will typically include an overview, showing the balance of the retirement account at the beginning of a specified period, as compared to the value of the account at the time when the statement is prepared. The account statement information will also show recent transactions, such as deposits, or trades done in the account.

The processing system includes an account statement information processor 203 which identifies and prepares the account statement information. It should be recognized that the preparation of the account statement can be done in numerous ways. For example, the information could be accessed by a processing system of the plan administrator, and the information could be transmitted to another processing system, which could be provided by a third party which is responsible for formatting the account statement information so that it can be incorporated into the integrated report. Collectively these separate processing systems, are considered, where the context so admits, to be part of the processing system 204.

In addition to extracting and preparing account statement information, the processing system 204 also provides for accessing an individual's financial account information, as well as the individual's personal information from the data storage system 202. This combination of both financial account information and personal information is then analyzed to determine the likely performance of the account relative to an individual's retirement needs. The financial planning processor 205 is programmed to analyze the account holdings and to analyze the individual's personal information, and to use other financial data to calculate the likely performance of the account over the individual's time horizon to retirement.

In one embodiment of the present invention the user need not affirmatively take any steps to receive the financial planning recommendation. Specifically, the financial planning processor 205 has access to, or is provided with, all the personal information from the data storage system 202 for an individual, which is necessary to analyze the financial investment account and to make financial planning recommendations which are likely to improve the predicted performance of the account over the individuals time horizon to retirement.

The analysis generated by financial planning processor 205 will include recommended modifications to the individual's retirement account to improve the predicted performance of the financial account. This financial planning advice, if followed by the individual, should improve the individual's chances of having the retirement account in a condition to provide for the individual's financial needs upon retirement.

The processor system 204 can include a report generating processor 201 programmed to incorporate financial planning advice with the individual's account statement information to generate the integrated report. The integrated report can be formatted such that it can be transmitted electronically to a printing system 206. The printing system after receiving the formatted integrated report will then print the report which can then be sent to the individual account holder. In addition, or alternatively, the processor system can format the integrated report for posting on a website 208 such that the individual account holder can access the integrated report using a personal computer with a web browser and connected to the internet such that in can communicate with the processor system. Additionally, or alternatively, the integrated report could also be sent directly to individual account holders via e-mail using an e-mailing system 210.

Figure 3:
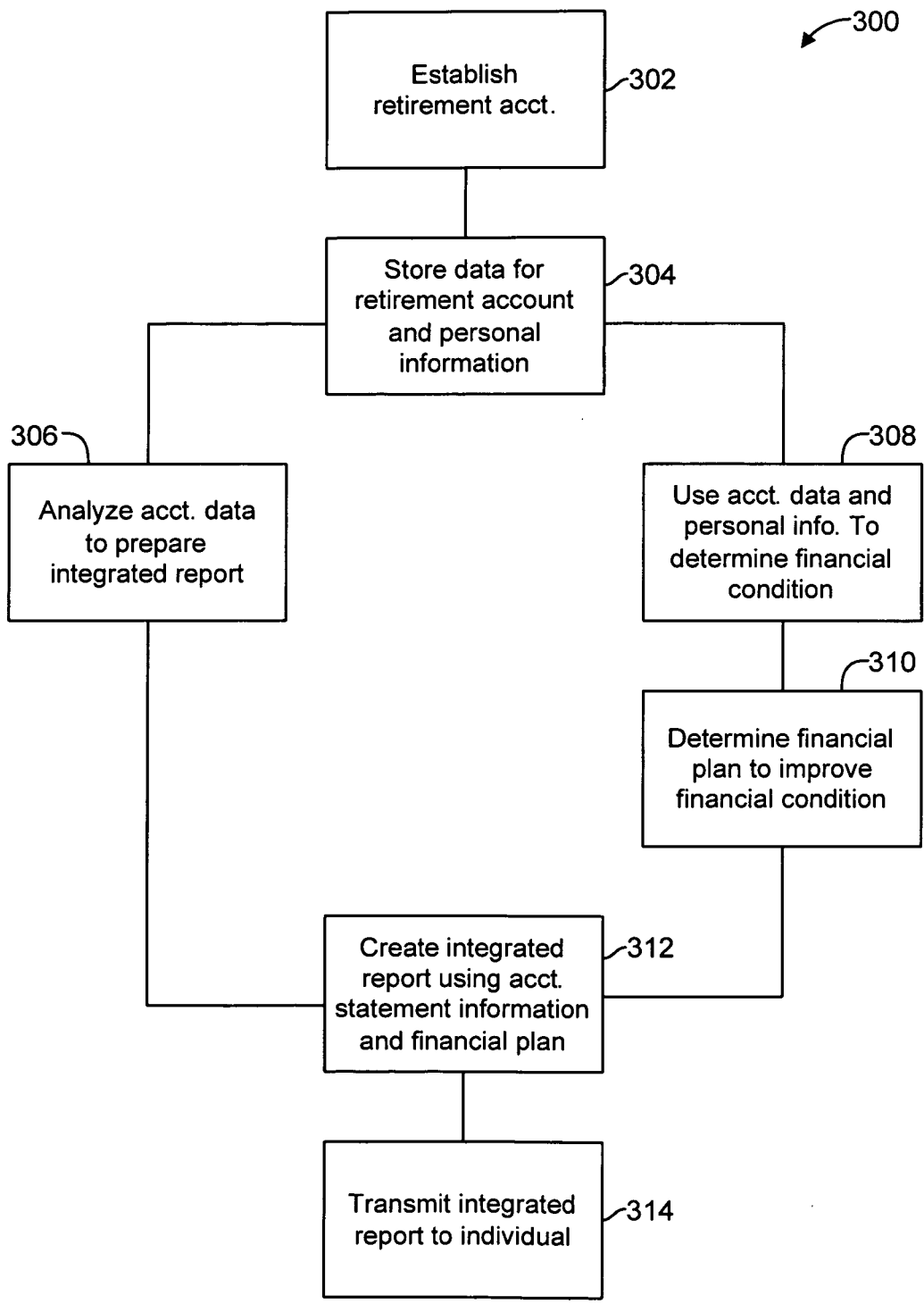
FIG. 3 is a flow chart illustrating a method for creating an integrated report.

FIG. 3 is a chart showing a process 300 for providing an individual with an integrated report. At step 302 a retirement account is established for an individual. In connection with establishing this retirement account the individual will provide personal information as described above, and this information will be stored 304 in a data storage system. In addition to the storing of personal information, information showing the holdings in the account and the activity in the account will also be stored. At step 306 the data stored for an account will be analyzed and account statement information will be identified and formatted so that it can be incorporated into the integrated report. At step 308 the account data and the personal information for an individual's account is analyzed. This analysis will typically also utilize other financial market information, asset allocation models, and/or other investment models to predict the performance of the account over the individual's time horizon to retirement. In addition to analyzing the expected performance of the account, step 310 provides for doing further analysis to determine a financial plan for improving the predicted performance of the account.

At 312 an integrated report is prepared which incorporates account statement information, and financial planning advice. At 314 the integrated report is transmitted to the individual account owner. Additional aspect of the process shown in FIG. 3 will be apparent from a review of the discussion provided herein in connection with FIG. 5.

Figure 4:
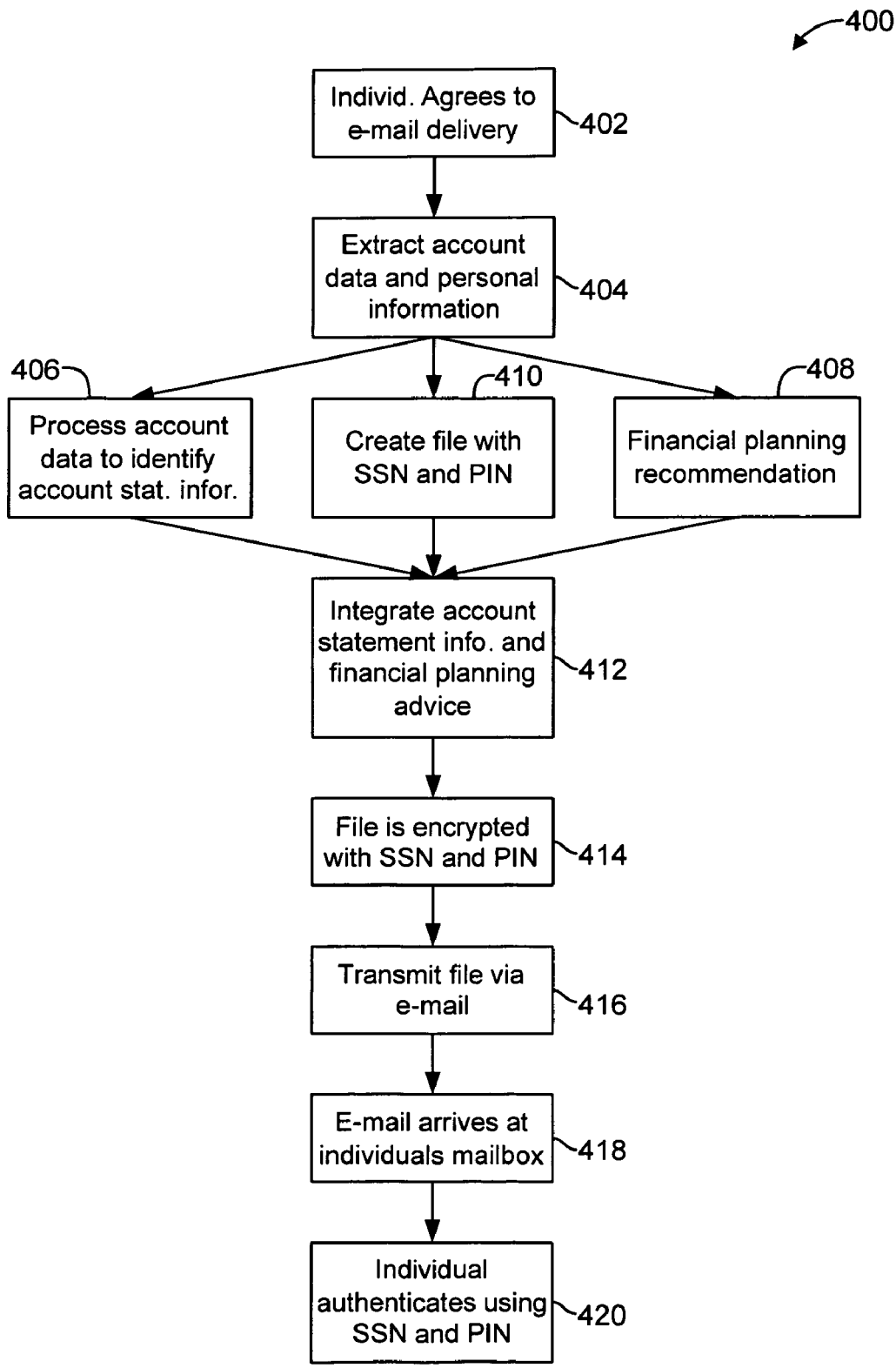
FIG. 4 is a flow chart illustrating a method of the creating an integrated report for transmission via e-mail.

FIG. 4 shows a process 400 for creating an integrated report and transmitting the integrated report by e-mail. At 402 the individual account owner agrees to have account statements transmitted via e-mail. After an individual has agreed to such delivery the integrated report can be sent via e-mail. At 404 account information and personal information for an account are extracted from the data storage system. At 406 account statement information extracted from the data storage system is processed and prepared so that it can be formatted for the integrated report.

At 408 the information extracted from the data storage system is analyzed and a financial planning recommendation is generated. Under the current regulations governing benefit plans such as 401(k) plans, it is beneficial (in many cases required) to have the financial planning advice generated by an independent third party. Thus, the necessary account information and personal information extracted from the data storage system can be transmitted to an independent third party for rendering the financial planning recommendation. This transmission is typically done over a communication network such as the interne, and the transmission can be encrypted using FTP protocol. At step 410 a file is created which includes information such as individual account owners social security number and personal identification number.

At step 412 a processor combines the account statement information, the financial planning advice and the file with the SSN and PIN into a file which makes up the integrated report. The processing at 412 can be done by a third party, so the information from steps 406, 408 and 410 can be transmitted electronically to the third party, and the third party combines the information to create the integrated report. It should be recognized that the integrated report need not be created by a third party and could instead be created by the plan administrator. At 414 the file which includes the integrated report is encrypted using the SSN and PIN. Once encrypted the file is sent 416 as an attachment to an e-mail. The e-mail with the integrated report attachment is then received by the individual at his or her e-mail inbox 418. The individual then opens the integrated report attachment, and in connection with opening the integrated report the individual must authenticate that they are the intended recipient by providing his or her social security number and PIN.

FIGS. 5 (*a-h*) show an embodiment of an integrated report. The integrated report shown in FIGS. 5 (*a-h*) is formatted to be transmitted via e-mail as described above. It should be understood that the individual account owners would typically access such e-mails using a personal computer, where such computer includes range of components including, a CPU, hard drive, ram, user interface device (including a mouse and a keyboard) and software, including a web browser. It should also be understood that this format could be adapted to provide for a report which could be printed, or could be posted on a website.

Figure 5A:
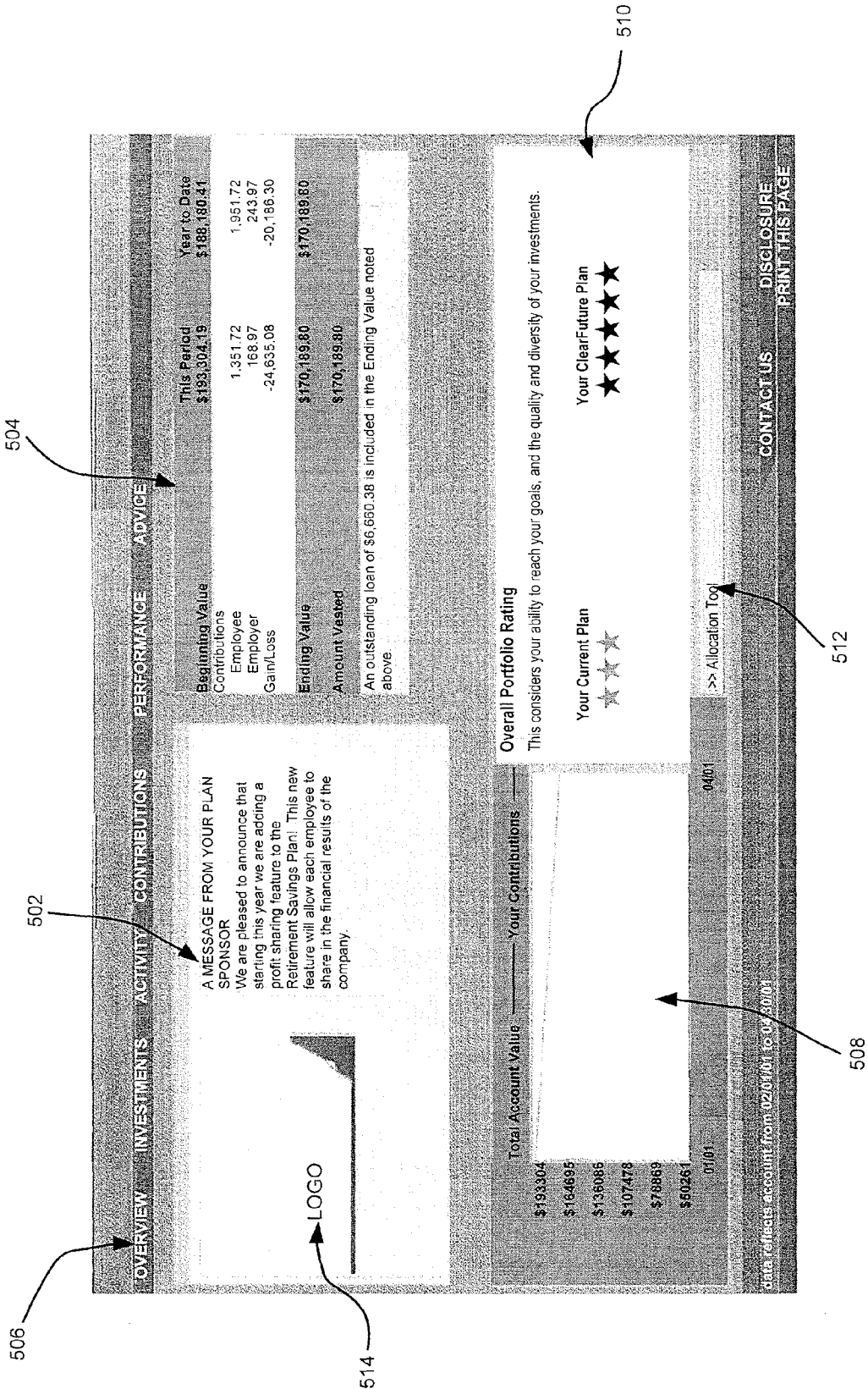

FIG. 5*a* shows a first page of an integrated report. Other pages, or areas, of the integrated report can be accessed by selecting different tabs along the top of the page. As shown in FIG. 5*a* the OVERVIEW tab 506 is selected, and the corresponding OVERVIEW page is displayed. The OVERVIEW page includes a number of different areas. Area 502 of the of the page corresponds to an area where the plan sponsor (i.e. the employer) can provide information to plan participants. Area 514 corresponds to an area where the plan sponsor can have their logo or name displayed. Area 504 shows an account summary. In this embodiment the account summary shows among other information, the value of the account holdings at the beginning of the year, and the beginning of a specified time period. The account summary also shows the value of the account as of the time of the account statement, and shows contributions made to the account by the employee and the employer during the specified time period.

Area 508 shows a graph illustrating the change in account value over the specified time period. Area 512 corresponds to a link to an asset allocation tool which is available via the web. The individual participant can click on this link and they will have access to an asset allocation tool which is available on-line.

Area 510 is an overall portfolio rating area. In the embodiment of FIG. 5*a* graphical symbols (i.e. stars) are used to indicate the likelihood that a plan participant's retirement account will have sufficient assets at the predicted retirement age for the plan participant. In the example shown, in area 510 if the individual participant continues with his or her present investment, or financial planning, strategy (e.g. current periodic contribution amount and present asset allocation) until the projected time of retirement they have a three star chance of having sufficient assets in the retirement account at his or her time of retirement. If the individual modifies his or her strategy with respect to the retirement account as set out in the financial planning recommendation in the integrated report, then the retirement account will have a five star chance, as shown under the heading "Your ClearFuture Plan", of having sufficient funds at the time of retirement. As shown the star rating system is from 1 to 5 stars, with 5 stars corresponding to the highest probability of meeting the retirement needs.

Figure 5B:
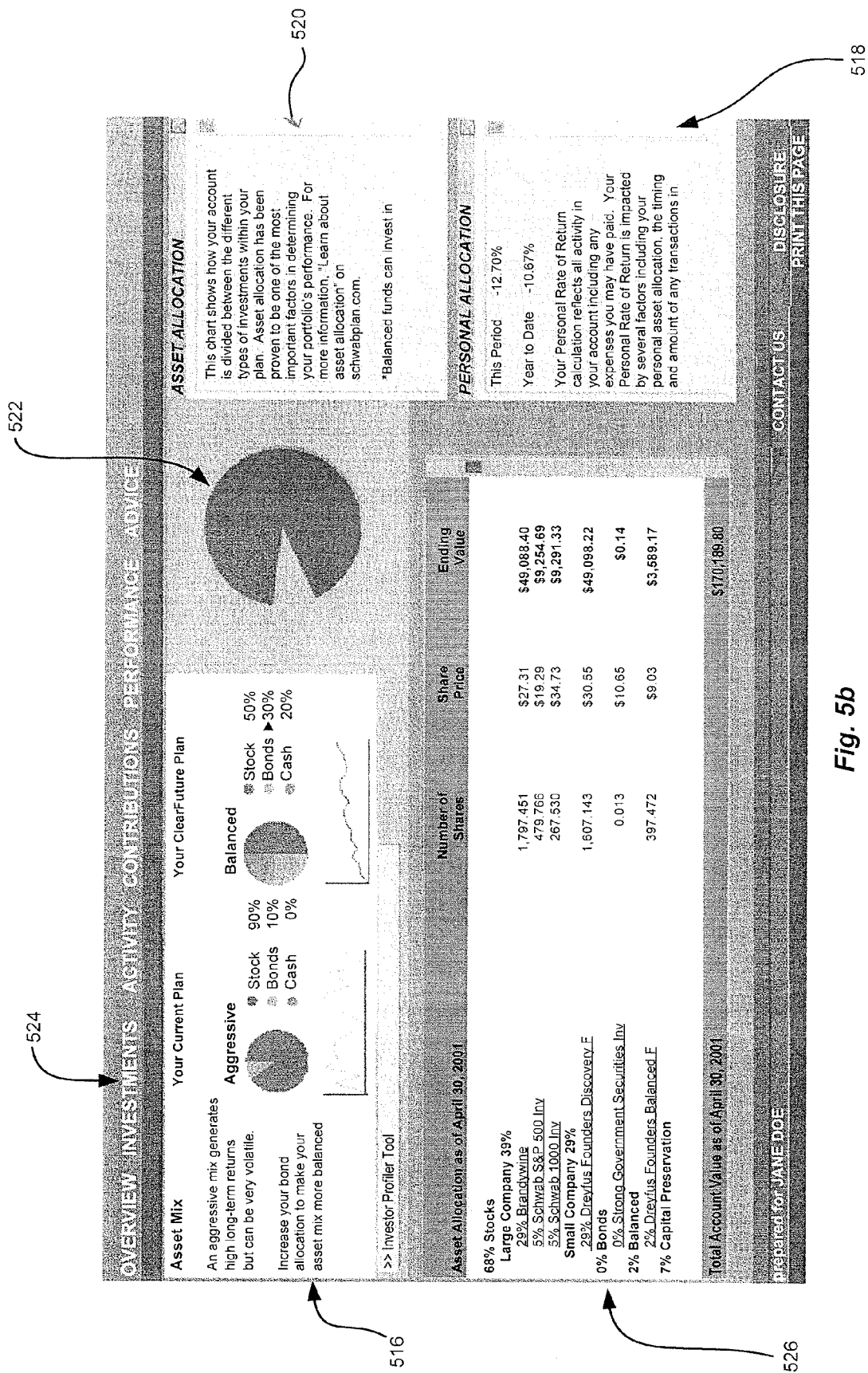

FIG. 5*b* shows a page of the integrated report which corresponds to information shown under the INVESTMENTS tab 524 of the integrated report. Area 516 is an asset mix advice area. The asset mix advice area 516 shows the current asset mix strategy in the account, and the asset mix strategy which is recommended in the integrated report is shown under the heading "Your ClearFuture Plan". As shown in FIG. 5*b* the present asset allocation for the account shown in the integrated report is 90% stock, 10% bonds and 0% cash. This information showing ht present asset allocation is account statement type of information. The asset mix advice area 516 further recommends that the asset allocation mix be changed to 50% stock, 30% bonds, and 20% cash. This information showing recommended asset allocation is part of the financial planning recommendation. As discussed in connection with FIG. 5, information showing historical transactions or performance of the account is account statement type of information. This is the type of information which has in the past been included in a typical account statement. The information showing recommended asset allocation is part of the financial planning recommendation. As discussed herein in connection with FIG. 5, information showing recommended changes, or strategies in connection with the account, as well as information showing the predicted performance of the account is part of the financial planning recommendation.

Area 522 is an exemplary dynamic chart that displays account asset allocation. In one embodiment this chart can operate such that when a cursor is hovered over a specific area of the chart, a specific dollar amount corresponding the portion of the chart under the cursor is shown, and assets corresponding to that asset type are highlighted in the asset list shown in area 526. Area 526 shows a list of assets held in the account. As shown this list is categorized under headings identifying the specific asset classes. The specific fund mutual fund names in area 526 can be active links to fund profile information. Area 518 shows information relating to the actual return in the account. Area 520 shows general information regarding the advantages of appropriate asset allocation in investing.

FIG. 5*c* shows a page of the integrated report which corresponds to information shown under the ACTIVITY tab 528 of the integrated report. Area 530 shows activity in the account by each investment in the account, including the value of each investment at the beginning and ending periods of the report, and the contributions into each investment.

Area 532 shows information about loans taken out of the account by the plan participant. Area 534 shows activity by contribution source.

Figure 5D:
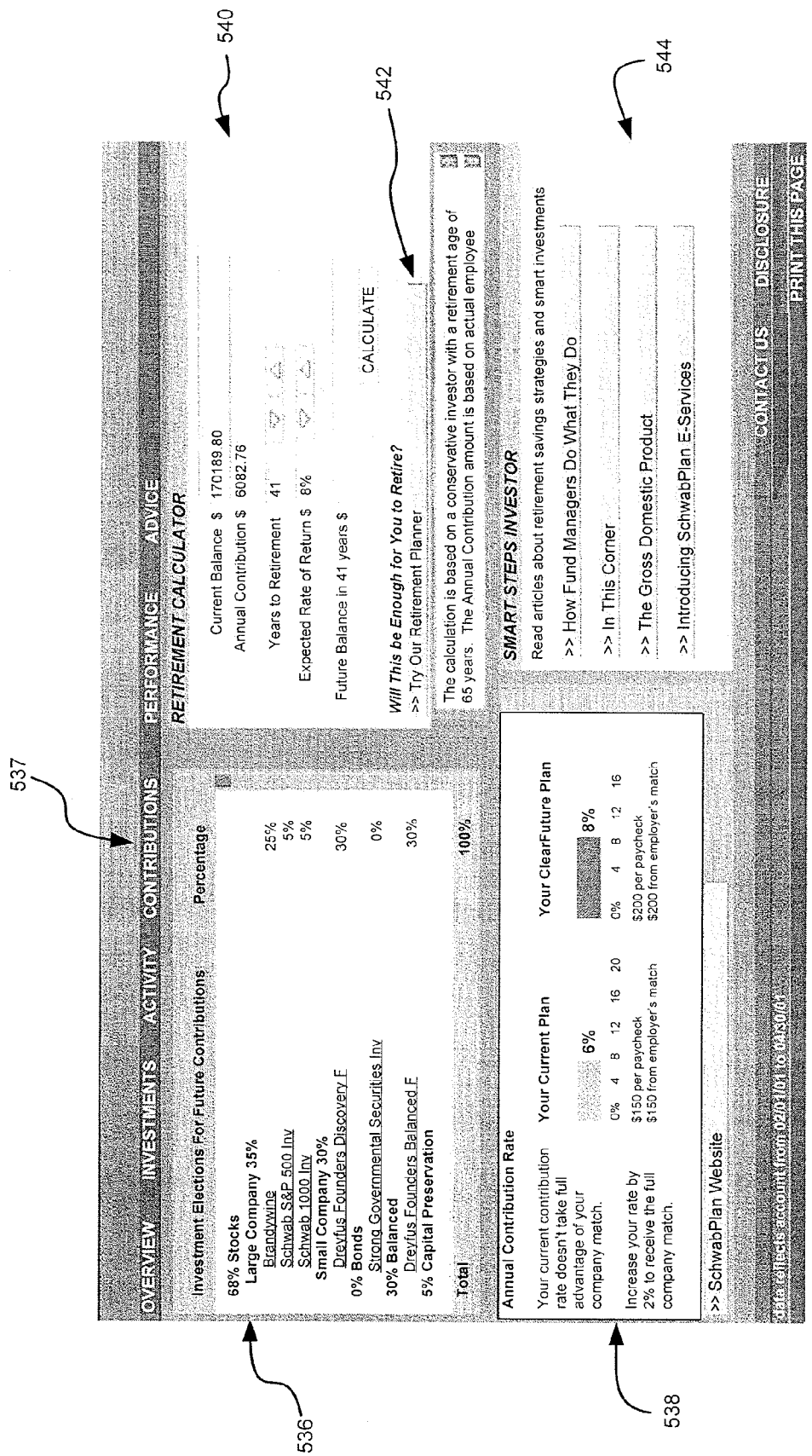

FIG. 5*d* shows a page of the integrated report which corresponds to information shown under the CONTRIBUTIONS tab 537 of the integrated report. Area 536 shows investment elections for future contributions to the retirement account. Area 540 is a retirement calculator. The retirement calculator can have fields with numbers already filled in with participant information from statement. In this embodiment the participant can change numbers in Annual Contribution, Years to Retirement and Expected Rate of Return fields—the "Calculate" button performs a quick calculation of future balance. Area 542 is a link to a website with a more comprehensive retirement planner. Area 544 contains links to articles about investing. It should be noted that an individual has the option of using these tools, but the financial planning advice shown in the integrated report of FIG. 5 is provided to the individual in regardless of whether the individual chooses to use these additional financial planning tools.

Area 538 is an annual contribution rate advice area. As shown in FIG. 5*d*, area 538 integrates a financial planning recommendation with current contribution information. Specifically, area 538 contains a message which recommends that the plan participant should increase his or her contribution amount to take full advantage of his or her employers company matching contribution. Under the "Your Current Plan" heading in area 538 a bar graph shows that the plan participant is currently contributing 6% of the individuals pay check to the retirement account, which corresponds to a $150 contribution by the individual and a $150 contribution by the employer. Under the " "Your ClearFuture Plan" a bar graph shows the recommended increase to contributing 8% of the participants pay to the retirement account, which corresponds to a $200 contribution by the participant and a $200 contribution by the employer.

Figure 5E:
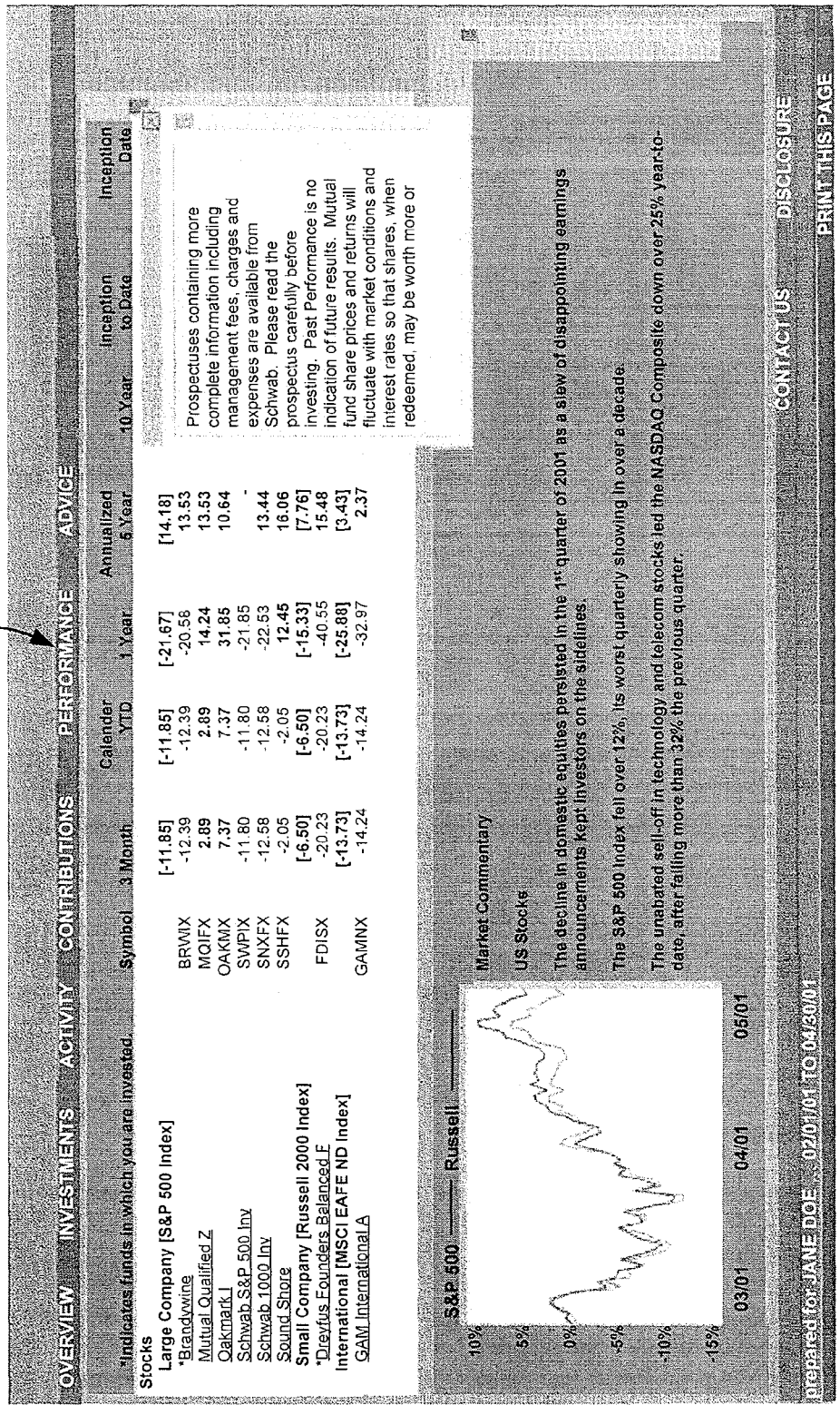

FIG. 5*e* shows a page of the integrated report which corresponds to information shown under the PERFORMANCE tab 547 of the integrated report. Area 548 shows the performance of specific investments over different time periods. Area 546 shows general information regarding financial markets.

Figure 5F:
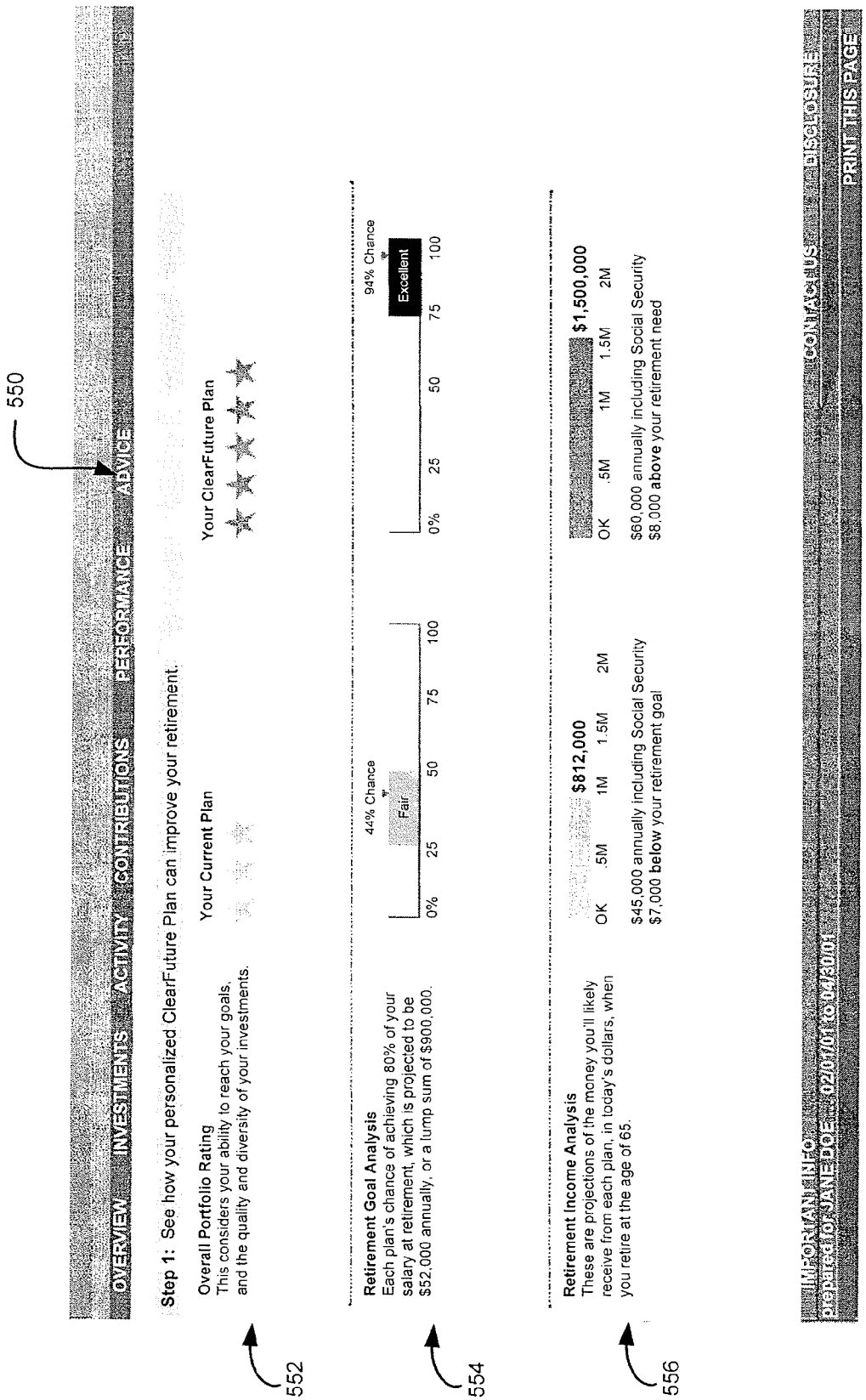
Figure 5G:
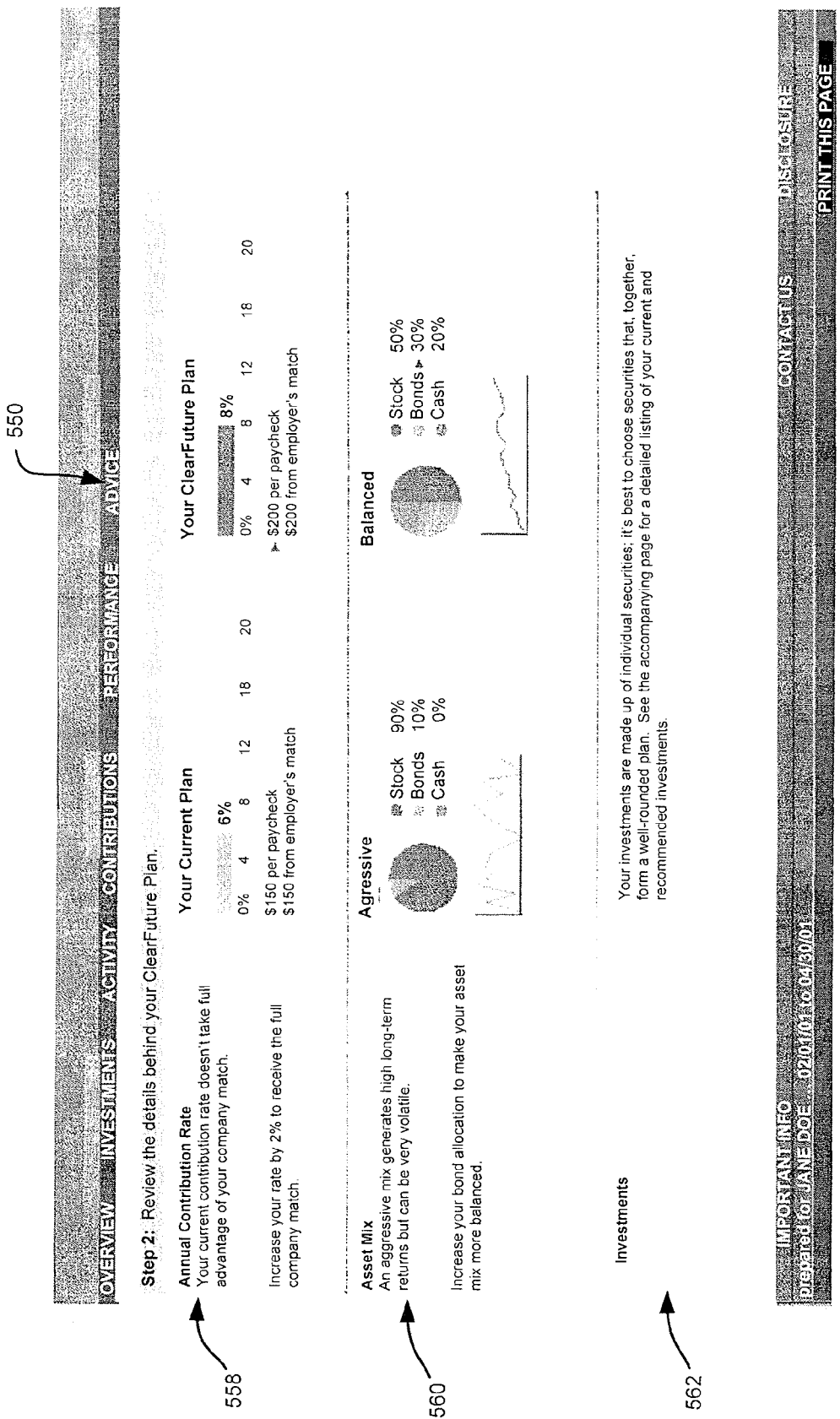
Figure 5H:
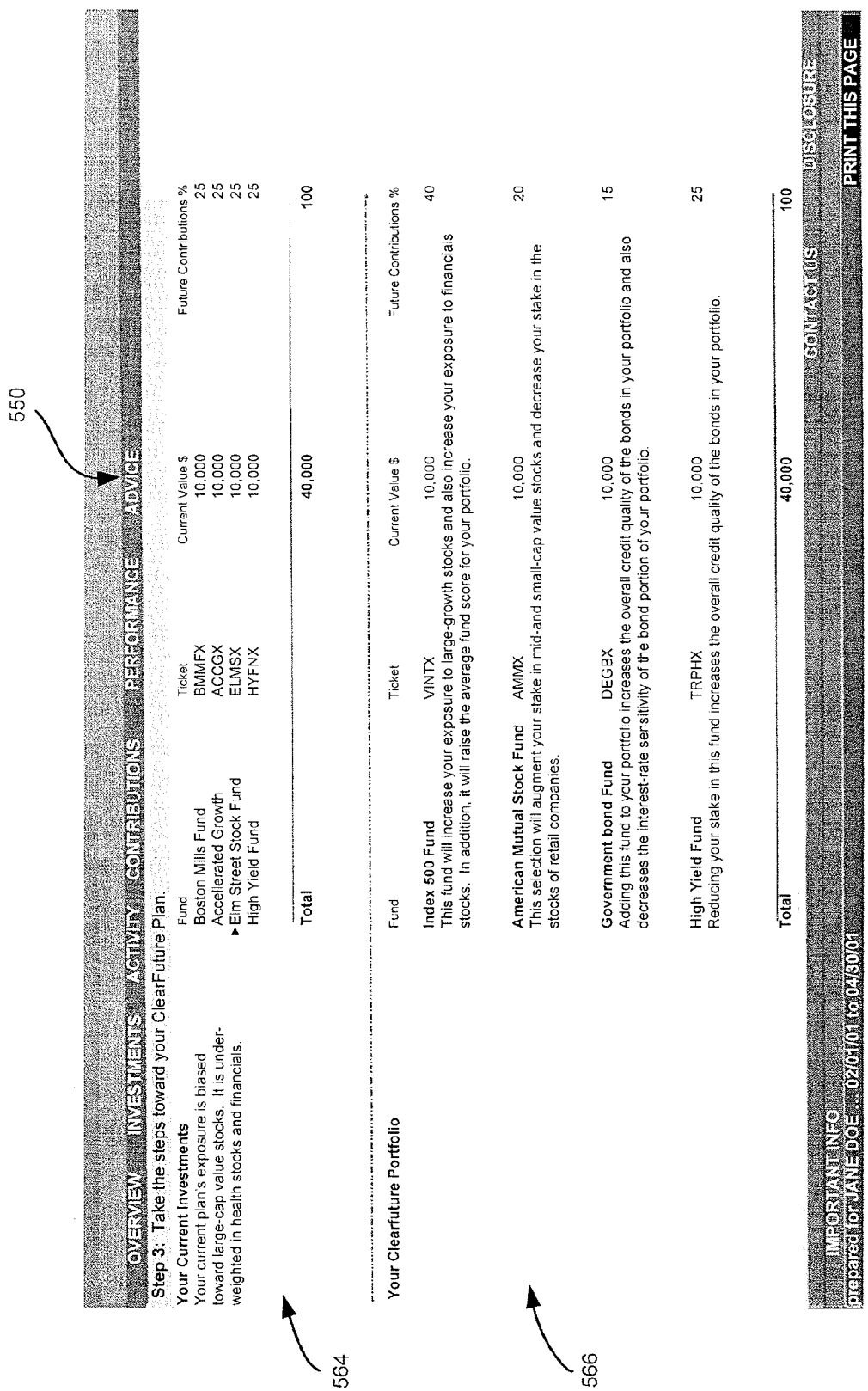

FIGS. 5*f*-5*h* show pages of the integrated report which corresponds to information shown under the ADVICE tab 550 of the integrated report. The information shown under the ADVICE tab is financial planning recommendation information can enhance the value of the integrated report. Depending on the specific implementation of the integrated report a user could move to different pages under the ADVICE tab by hitting the tab key on a keyboard, or the integrated report could be configured such that information shown in FIGS. 5*f*-5*h* are configured into a single page and the user can use mouse cursor to scroll through the information.

As described above, the integrated report includes all the information of a prior account statement and adds a personalized financial planning recommendation. In one embodiment the personalized financial planning recommendation is generated by an independent third part using a third party financial planning processing system (e.g. a processor programmed to use personal information, account information, and financial data, to determine financial planning advice).

The financial planning processor analyzes personal information for an individual, and makes recommendations based upon the individual's current portfolio, projected balances at retirement and the current deferral rate. Moreover, in the preferred embodiment the financial planning recommendation would recommended investments (and would specify dollar amounts and the accompanying percentage of total investment) in specific funds from the plan's fund line-up (i.e. investments available under a benefit plan).

Area 552 of FIG. 5*f* shows a portfolio rating for the current investment strategy as embodied by the assets held in the account at the time the report is prepared, and compares it against a recommended strategy where the suggested portfolio contains a different mix of assets or investments. The rating is shown using a 1 to 5 scale, where the scale is shown as corresponding to a number of stars. Area 554 provides a retirement goal analysis, which can be included in the financial planning recommendation. In one embodiment a projection is made which estimates the chance of reaching a goal of annual withdrawal of 80% of salary, based on the assets held in the individual's account and the individual's annual salary deferral rate. In the example shown in area 554, the projected 80% of salary correspond to withdrawing $52,000 annually, or a lump sum withdrawal of $900,000. The withdrawal period would be based on actuarial data showing the participants life expectancy. As shown, under the current strategy there is a 44% of reaching this goal. Under the suggested plan (i.e. Your ClearFuture Plan) there is calculated to be a 94% chance of reaching the goal at the time of retirement.

Area 556 provides a retirement income analysis which predicts the balance at retirement for the current plan (i.e. the current mix of assets and deferral rate) and compares it against the projected account balance under the suggested plan. (In one embodiment the retirement age is assumed to be 65). As shown in area 556 under the current plan the participant is projected to have $812,000 dollars at retirement, which would correspond to $45,000 of income including social security at time of retirement which in the case shown would be $7,000 below the goal of $52,000. Under the Your ClearFuture plan it is projected that the account will have $1,500,000 which corresponds to $60,000 annually including social security which is $8,000 above the projected retirement needs.

Area 558 of FIG. 5g shows the annual contribution rate as a percentage of salary, and may also provide advice as to adjusting the amount of contribution to take advantage of possible employer matching if provided under the benefit plan. The details shown in area 558 are the same as those discussed above.

Area 560 shows the asset mix of a current account portfolio for a participant. The pie chart shows the asset mix in terms asset classes stocks, bonds and cash. Where the asset mix is determined not to be optimally suited for a participant a recommended balanced asset mix is provided using a pie chart. Area 562 shows an overview of the strategy used to select specific securities which are recommended on the accompanying page of the integrated report which is shown in FIG. 5h.

FIG. 5h, in area 564, shows a listing of the specific investments held in an individual's account. By analyzing the investments held the financial planning processor can determine the likelihood that the investment strategy embodied by the current mix of assets is likely to meet the individual estimated retirement needs. The financial planning processor further reviews and the mix of investments strategy options to the individual (e.g. how much can the individual contribute annually, what investments are available under the plan etc.) and determines a financial planning recommendation which includes a strategy that can increase the likelihood that the account will meet the estimated retirement needs for the individual.

Area of 566 shows a recommended portfolio of the financial planning recommendation. It should be noted that area 566 is shown for illustrative purposes and does not necessarily show an actual financial planning recommendation that would be provided an individual.

Figure 6A:
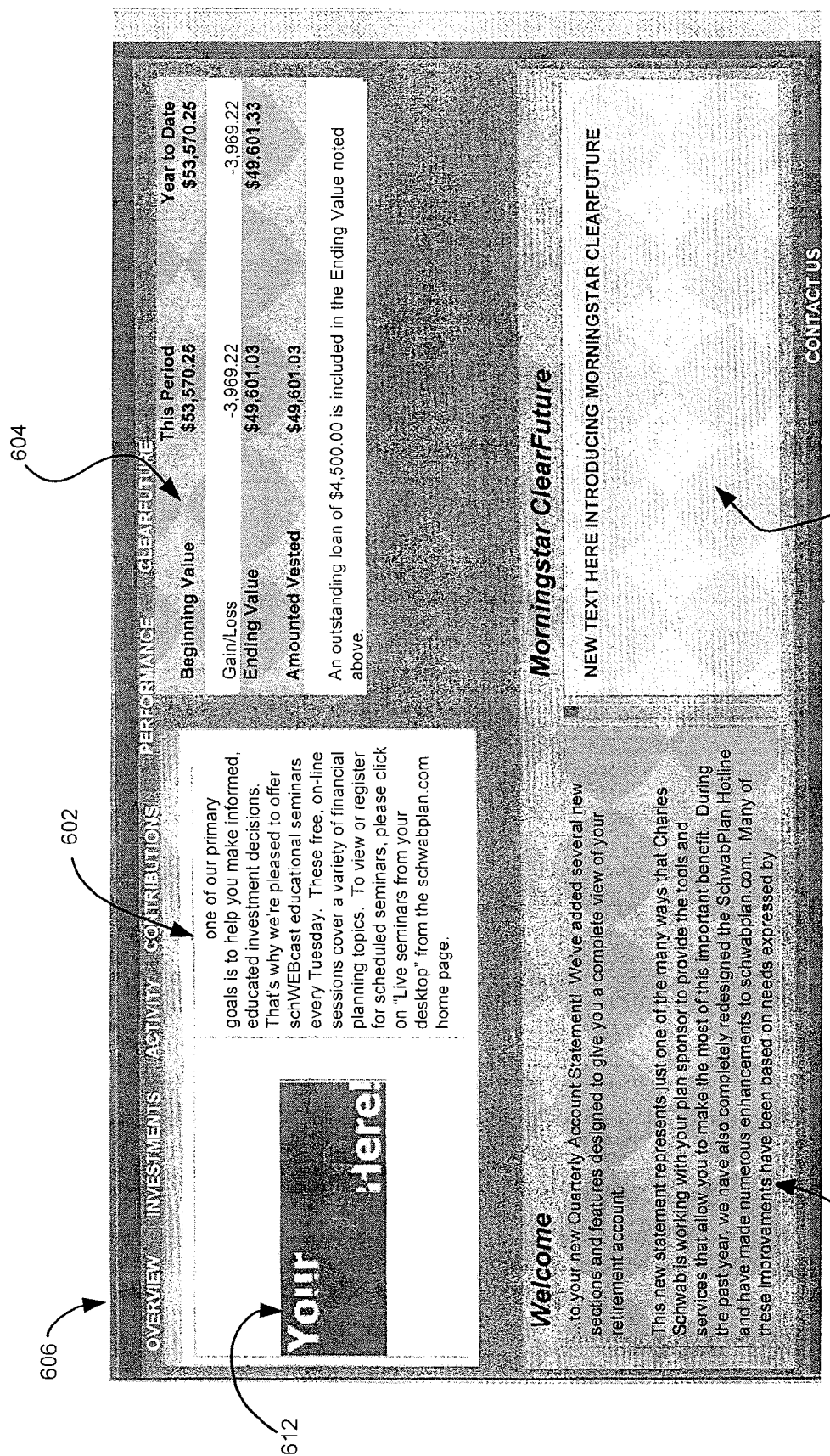

FIGS. 6a-6f show additional views of alternative approaches to some of the embodiments shown in connection with FIGS. 5a-5h. FIG. 6a shows an alternative embodiment of the overview page, which corresponds to the overview tab 606. Area 602 corresponds to an area where the plan sponsor can provide information to plan participants. Area 608 is an area where the plan administrator can provide information to plan participants. Area 604 shows an account summary. In this embodiment the account summary shows different historical values for the account. Area 610 is an area where financial planning information can be provided. Typically, financial planning information provided in this area would be a simple high-level overview.

FIG. 6b shows a page of the integrated report which corresponds to information shown under the investments tab 614. Area 616 shows a pie chart which corresponds to an investors present asset allocation mix. Area 618 shows a pie chart which corresponds to a recommended asset allocation mix. Area 620 shows general information regarding the advantages of appropriate asset allocation in investing. Area 624 shows a list of assets held in the account. Area 622 shows information regarding the return rate in the account.

Figure 6C:
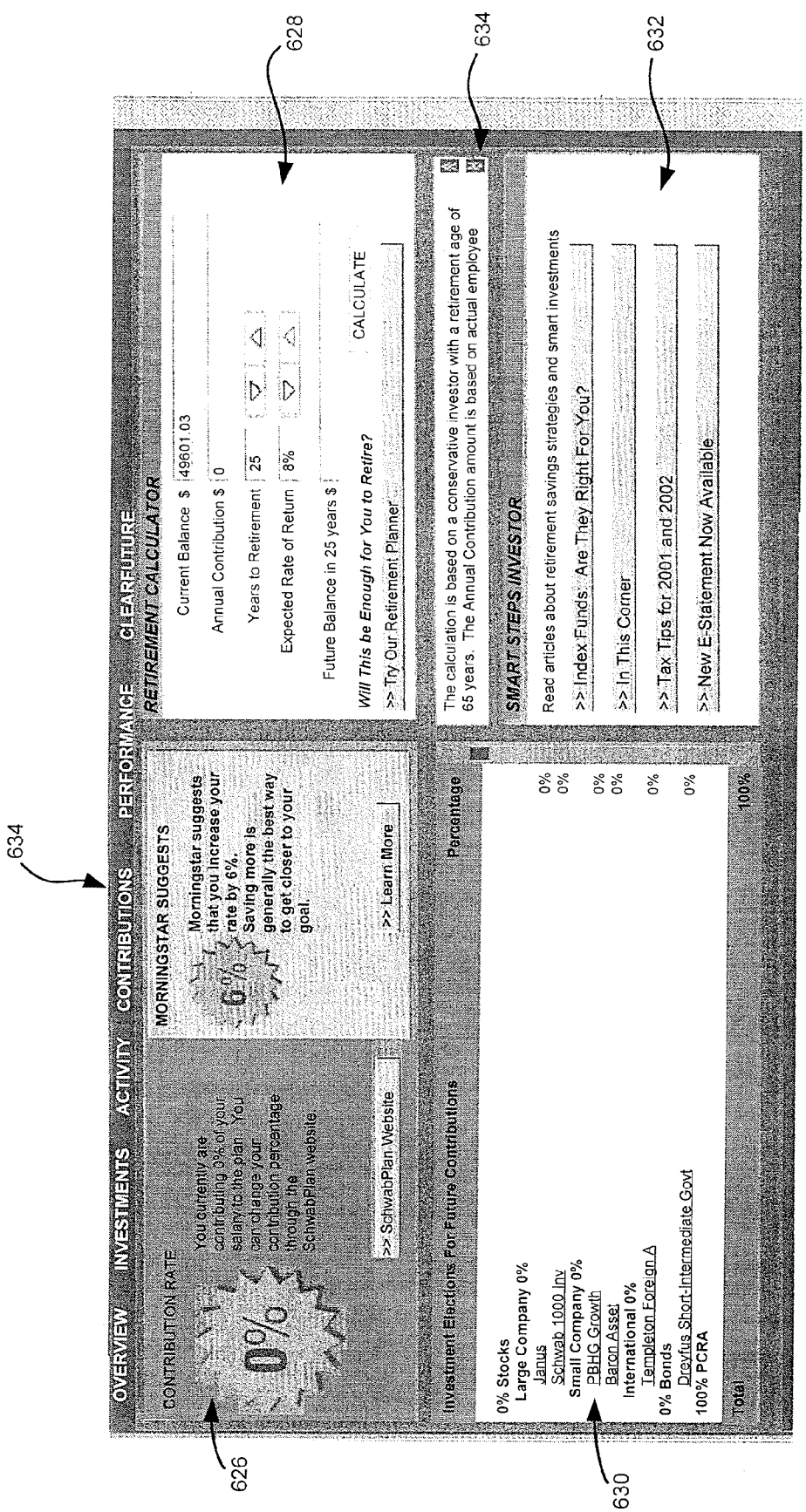

FIG. 6c shows a page of the integrate report which corresponds to information shown under the contributions tab 634. Area 626 shows the present contribution rate for the individual and the recommended contribution rate for the individual. Area 630 shows recommend investment elections for future contributions. Area 628 corresponds to an interface for a retirement calculator. Area 634 provides information regarding the calculations used in the retirement calculator 628. Area 632 provides tabs which the user can click on to get additional information regarding managing retirement plans.

Figure 6D:
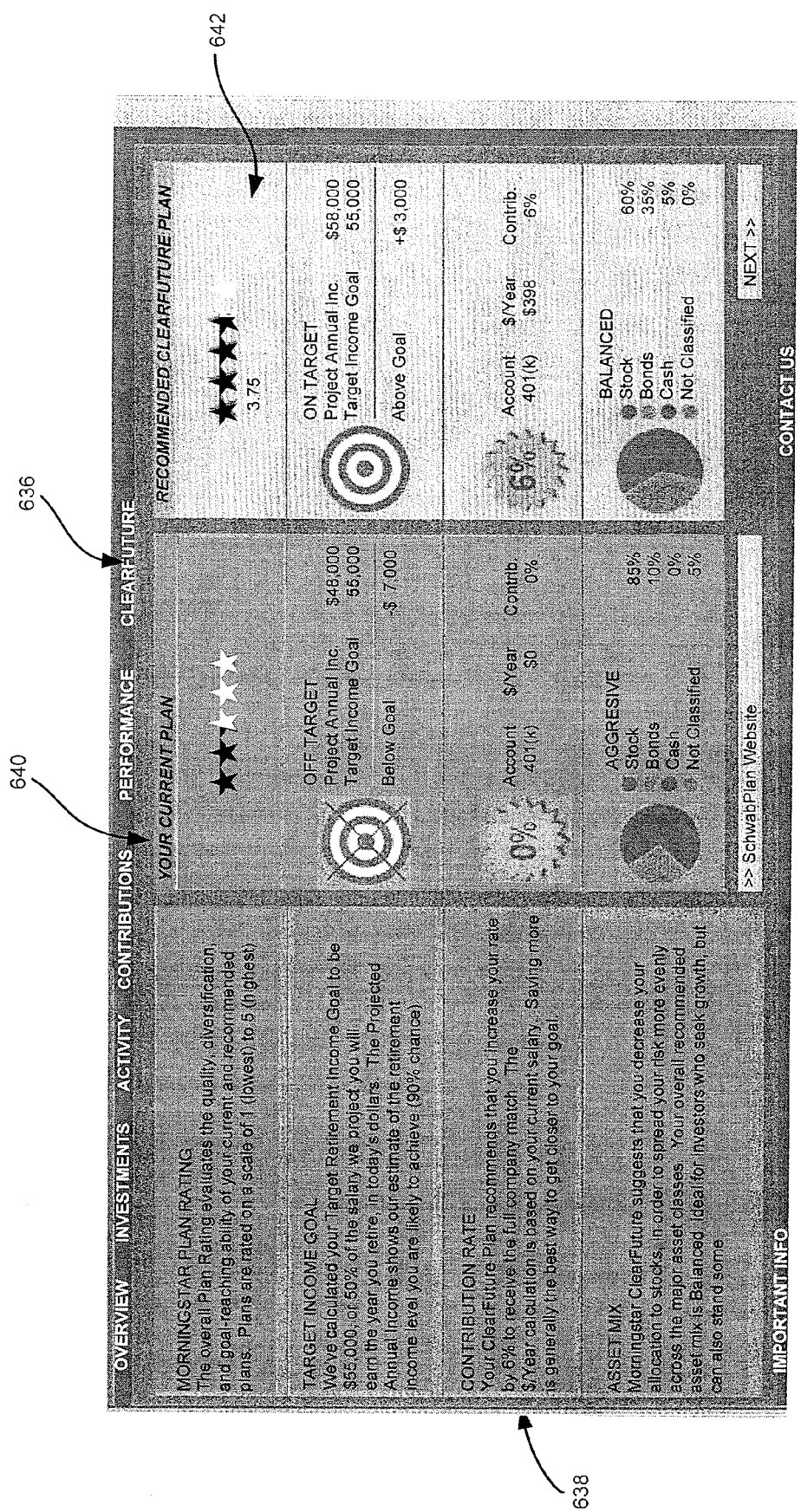

FIG. 6d shows a page of the integrated report which corresponds to the "CLEARFUTURE" tab. In the embodiment shown in FIG. 6d the first page under the CLEARFUTURE tab includes 3 columns. Column 640 shows the predicted likelihood that the individual will have enough money in their retirement account to meet the estimated retirement needs, assuming the current investment strategy is followed. Column 642 shows the predicted likelihood that an individual will have enough money in their retirement account upon retirement, if they follow the recommended financial planning advice. Column 638 includes information contained in corresponding rows of information from columns 640 and 642.

Figure 6E:
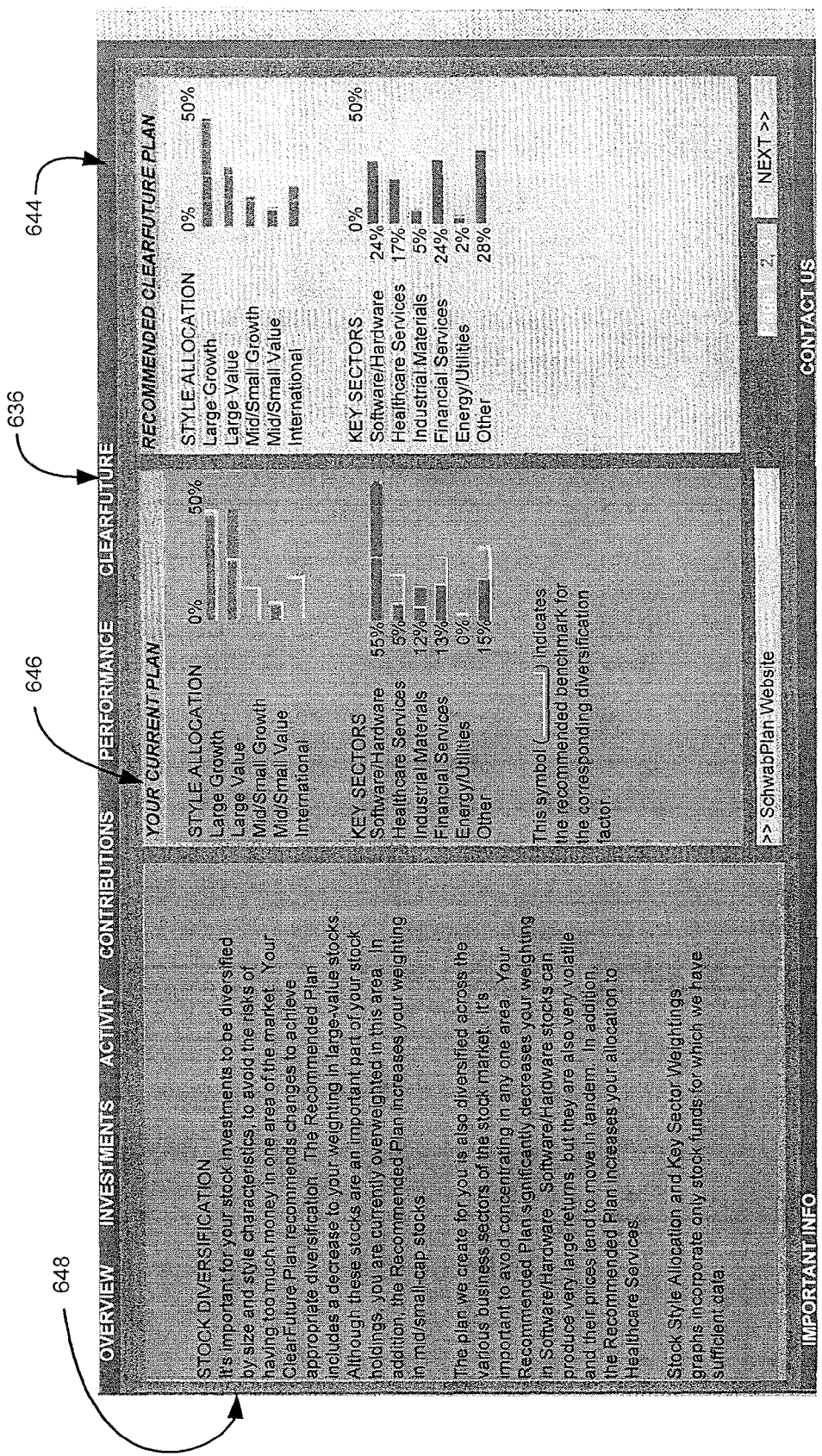

FIG. 6e shows a second page under the CLEARFUTURE tab. This page includes a column 648 with information regarding investment strategy. Column 646 shows information regarding the present asset allocation as determine by the current investments held in a retirement account. Column 644 shows the recommended asset allocation for the retirement account.

Figure 6F:
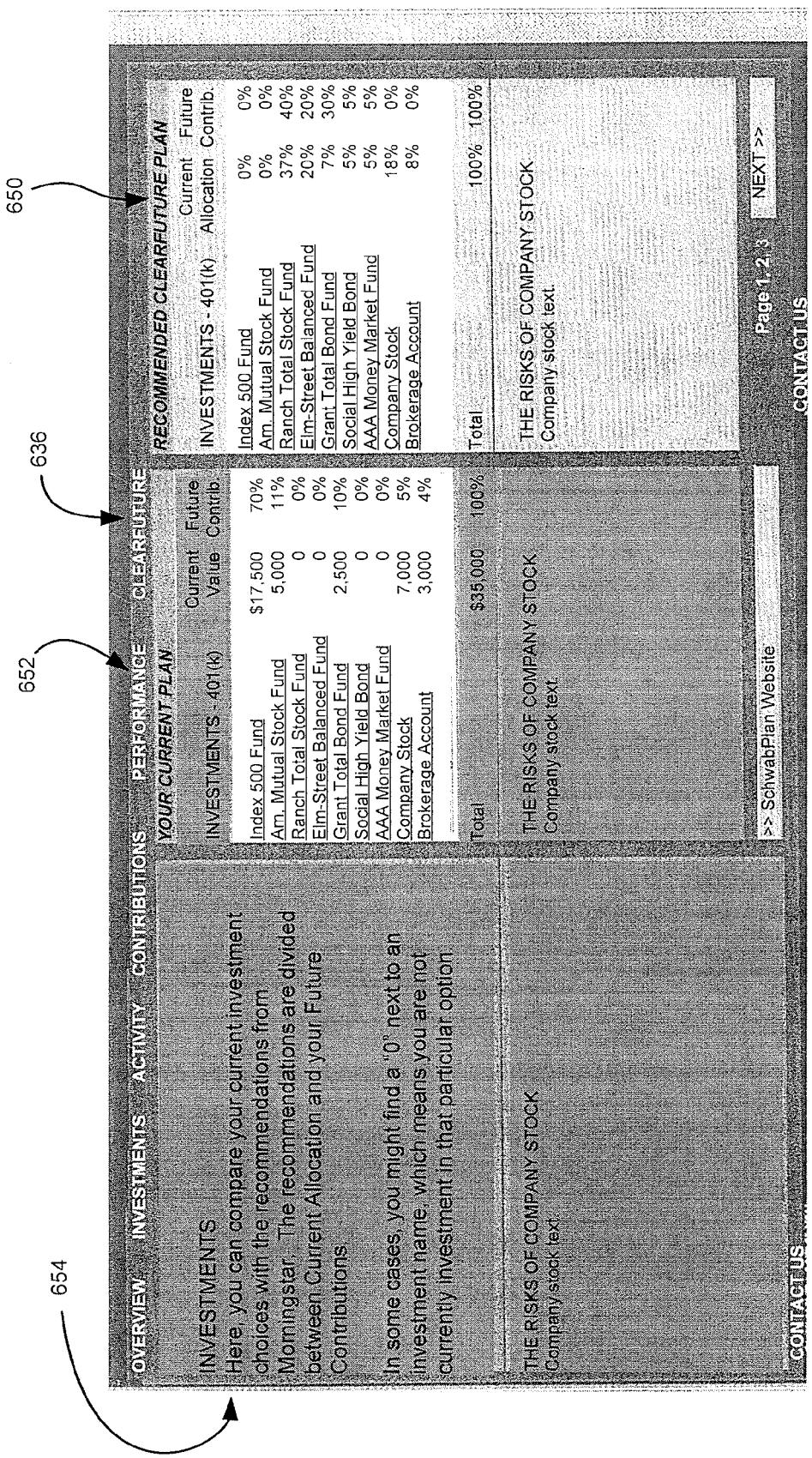

FIG. 6f shows third page under the CLEARFUTURE tab. Column 654 of this page includes explanation for information shown in columns 652 and 650. Column 652 shows specific investments currently held in an account. Column 650 shows a recommended allocation for the investment options that are available, and a recommendation for future contributions.

While the method and apparatus of the present invention have been described in terms of specific embodiments, those skilled in the art will recognize that the present invention may be practiced with modification and alteration within the spirit and scope of the appended claims, and their equivalents. The specifications and drawings are, accordingly, to be regarded in an illustrative rather than a restrictive sense. Further, even though only certain embodiments have been described in detail, those having ordinary skill in the art will certainly understand that many modifications are possible without departing from the teachings thereof. All such modifications are intended to be encompassed within the claims set forth below.

What is claimed is:

1. A method comprising:
   identifying in a data storage system: financial account statement information associated with a financial account of an individual;
   determining with a processing system an estimated retirement goal for the individual based on personal information of the individual, wherein the personal information is submitted to the data storage system at the time the financial account of the individual is created, and determining a financial planning recommendation based on said information comprising the estimated retirement goal and the financial account statement information, the financial planning recommendation comprising a financial planning strategy; and
   periodically generating with the processing system an integrated report comprising the financial account statement information and the financial planning recommendation without requiring periodic input or action from the individual, wherein the financial planning recommendation comprises a predicted likelihood that a current investment strategy associated with the financial account will meet the estimated retirement goal for the individual and a predicted likelihood that a recommended financial planning strategy will meet the estimated retirement goal for the individual.

2. The method of claim 1, further comprising providing the integrated report to the individual.

3. The method of claim 1, wherein the financial planning recommendation includes a comparison of the predicted likelihood that the current investment strategy associated with the financial account will meet the estimated retirement goal for the individual as compared to a predicted likelihood that a recommended financial planning strategy will meet the estimated retirement goal for the individual.

4. The method of claim 1, wherein the recommended financial planning strategy is predicted to improve the performance of the financial account.

5. The method of claim 1, wherein the financial account statement information comprises transaction information and an identification of assets currently held in the financial account.

6. The method of claim 1, wherein the financial account statement information comprises a current value of assets held in the financial account.

7. The method of claim 1, wherein the personal information comprises a desired age of retirement for the individual.

8. The method of claim 1, wherein the personal information comprises an amount of income for the individual.

9. The method of claim 1, wherein the financial planning recommendation comprises a recommended asset allocation.

10. The method of claim 1, wherein the financial planning recommendation comprises a projection of retirement income based on the current investment strategy associated with the financial account.

11. The method of claim 1, wherein the financial planning recommendation is generated by an independent third party.

12. The method of claim 1, wherein the personal information comprises a number of dependents and an annual salary.

13. A method comprising:
identifying in a data storage system, financial account statement information associated with a financial account of an individual;
determining with a processing system an estimated retirement goal for the individual based on personal information of the individual, wherein the personal information is submitted to the data storage system at the time the financial account of the individual is created, and determining a financial planning recommendation based on said information comprising the estimated retirement goal and the financial account statement information, the financial planning recommendation comprising a recommendation identifying one or more investments for the individual to purchase; and
periodically generating with the processing system an integrated report comprising the financial account statement information and the financial planning recommendation without requiring periodic input or action from the individual, wherein the financial planning recommendation comprises a predicted likelihood that the financial account will have funds to meet the estimated retirement goal if the individual purchases the identified one or more investments.

14. The method of claim 13, further comprising providing the integrated report to the individual.

15. The method of claim 13, wherein the financial planning recommendation comprises a predicted likelihood that the financial account will have funds to meet an estimated retirement goal based on a current investment strategy.

16. The method of claim 13, wherein the financial planning recommendation includes a comparison of a predicted likelihood that a current investment strategy associated with the financial account will meet the estimated retirement goal for the individual as compared to the predicted likelihood that the financial account will have funds to meet the estimated retirement goal if the individual purchases the identified one or more investments.

17. The method of claim 16, wherein the financial planning recommendation comprises the recommended financial planning strategy.

18. The method of claim 13, wherein the financial planning recommendation is predicted to improve the performance of the financial account.

19. The method of claim 13, wherein the financial account statement information comprises transaction information and an identification of assets currently held in the financial account.

20. The method of claim 13, wherein the financial account statement information comprises a current value of assets held in the financial account.

21. The method of claim 13, wherein the personal information comprises a desired age of retirement for the individual.

22. The method of claim 13, wherein the personal information comprises an amount of income for the individual.

23. The method of claim 13, wherein the financial planning recommendation comprises a recommended asset allocation.

24. The method of claim 13, wherein the financial planning recommendation comprises a projection of retirement income based on the current investment strategy associated with the financial account.

25. A system comprising: a data storage system storing financial account information associated with a financial account and personal information for the individual, wherein the personal information is submitted to the data storage system at the time the financial account of the individual is created;
a processor communicatively coupled to the data storage system, the processor configured to:
retrieve the financial account information and the personal information from the data storage system;
identify financial account statement information for the financial account;
determine a financial planning recommendation for the individual, the financial planning recommendation based on said information comprising the financial account statement information and personal information;
periodically generate an integrated report for the individual comprising the financial account statement information and the financial planning recommendation without requiring periodic input or action from the individual, wherein the financial planning recommendation is related to a retirement benefit plan and comprises a predicted likelihood that a recommended financial planning strategy will meet the estimated retirement goal for the individual; and
provide the integrated report to the individual.

26. The system of claim 25, wherein the integrated report is provided to the individual electronically.

27. The system of claim 25, wherein the integrated report is printed.

* * * * *